Sept. 20, 1932.   K. E. PEILER   1,878,597
AUTOMATIC DIP REGULATOR FOR SUCTION GATHERING RECEPTACLES AND THE LIKE
Filed May 10, 1929   2 Sheets-Sheet 1

Witness:
Winslow B. Thayer.

Inventor:
Karl E. Peiler
by Brown & Carlam
Attorneys

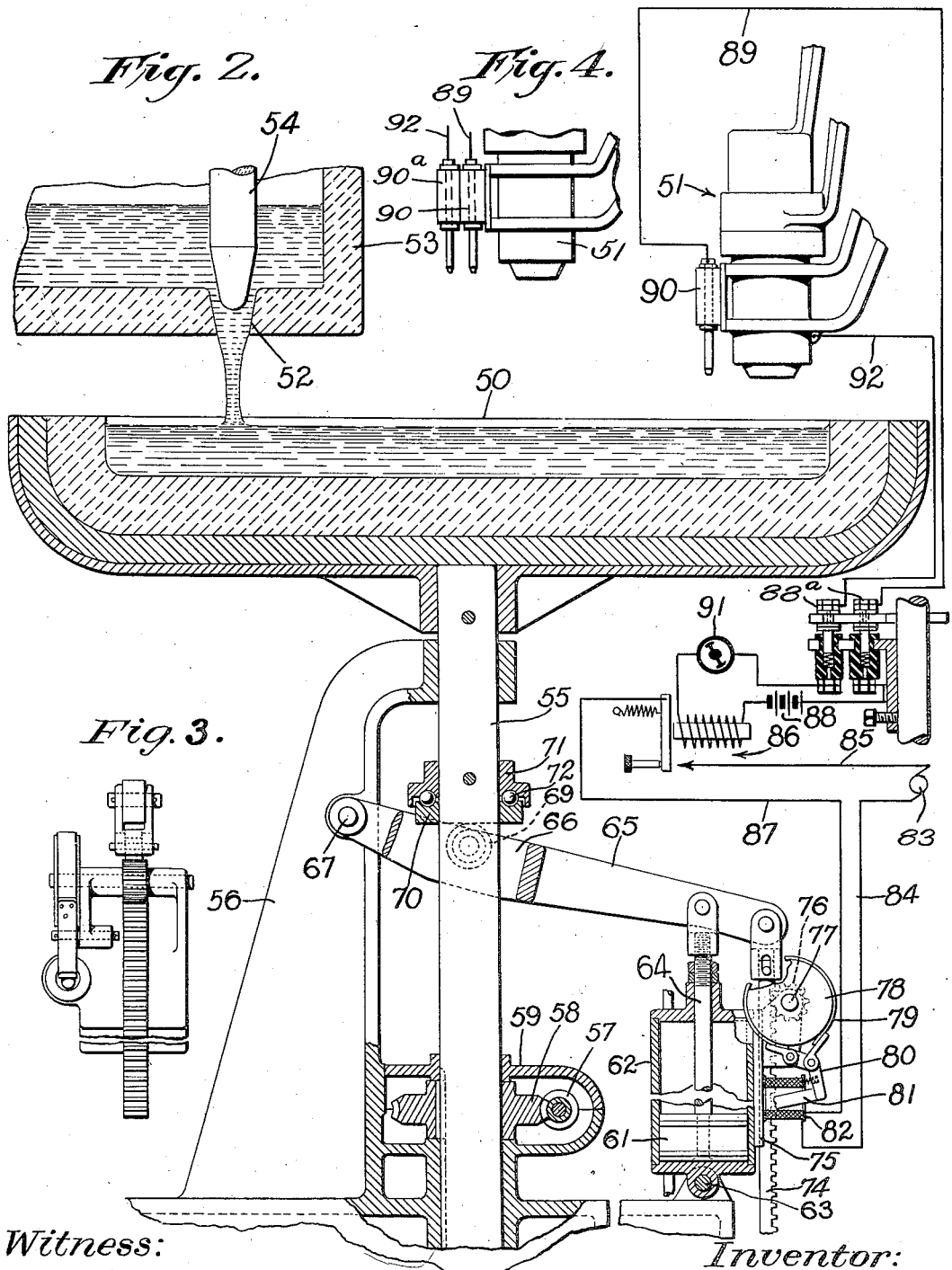

Patented Sept. 20, 1932

1,878,597

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

AUTOMATIC DIP REGULATOR FOR SUCTION GATHERING RECEPTACLES AND THE LIKE

Application filed May 10, 1929. Serial No. 361,854

My invention relates to the art of gathering molten glass from a pool, as by suction for example, and more particularly to glass gathering and forming apparatus of the type embodying a plurality of glass gathering receptacles, usually adapted for the formation of glass parisons therein, and also embodying appropriate supporting and operating mechanism for bringing the respective receptacles in turn over the gathering pool and for then causing the lower end of each gathering receptacle to contact with, or be immersed in, the glass of the pool for the time required for a glass gathering operation.

In the gathering of molten glass by apparatus of this general type, it is usual to move the gathering receptacle successively to a position above an adjacent pool, and to cause each receptacle to be dipped in its turn into contact with the glass in the pool. The glass pool may be provided in a melting tank extension or boot, or in a revolving gathering pot, or other container, and means generally is provided for maintaining the glass in the pool at a substantially constant or predetermined level. The glass in the gathering pool may be kept hot by the heat confined in a fire space provided by a cover extending over the pool.

It also has been proposed to effect the dip of the suction gathering receptacles in a pool contained in a gathering pot by moving the pool vertically relatively to the said receptacles, which receptacles are successively moved to a position above the pool, but may be maintained at a substantially constant level.

It has been usual in performing the above and other suction gathering methods which have been proposed prior to my invention, to provide suction gathering receptacles or molds of the forming machine of substantially the same length and capacity, this having been regarded as essential because of the necessity of dipping the molds into the bath to approximately the same extent. To these ends, various attempts have been made to maintain a constant or predetermined level of glass in gathering pool. Moreover, it has been the practice, for various reasons, to provide a rotary pot of considerable area and a forming machine having a large number of similar suction gathering molds for use with the said pot. Consequently, the employment of the suction gathering mold ordinarily has been economical only when used to supply large orders of certain types of glassware of the same size and shape.

Therefore, it is an object of the present invention to provide means of novel construction which operates automatically to cause each of the gathering receptacles or molds of a forming machine to be dipped into the glass in the gathering pool to the proper depth irrespective of the length of such gathering receptacle or mold and of variations in the level of the glass in the said pool. For the accomplishment of this object, I may employ means adapted to contact with the glass for "feeling" or ascertaining the level of the glass in the pool, such means controlling the flow of electric current through a circuit which, in turn, controls the dip of the molds according to the level of the glass at the time of contact of the said means with the glass. This, broadly, is an application of the principle of the invention disclosed and claimed in my copending application, Serial No. 362,954, filed May 14, 1929. By employing such means, as described above, I am enabled to produce, in the same forming machine, glassware of good quality and of varying shapes and sizes.

A further object of my invention is to provide novel apparatus including mechanism for providing relative vertical movements between the gathering molds or receptacles of a forming machine and a gathering pool, and means for automatically stopping the operation of such mechanism when any one of the molds or receptacles has been immersed or dipped into the glass to the desired depth. Thus, if the gathering molds of the forming machine are of different lengths and capacities, each of them will be dipped in the bath to the proper depth for the gathering of a charge of glass of the required size.

A further object of my invention is to provide novel apparatus of the above character including mechanism for causing the molds of the forming machine to be moved successively to a position above the gathering pool and to be lowered thereinto, the operation of the said mechanism being automatically stopped when each of the molds is dipped into the bath to the required depth. By thus regulating the dip of the various molds into the bath, a forming machine of the character in which the suction molds are moved relatively to the gathering pool may be provided with molds of different sizes and capacities and glass ware of good quality produced thereby.

A more specific object of my invention is to provide novel apparatus of the above character wherein the suction gathering receptacles or molds are successively dipped into the both of a gathering pool to the required depth automatically, as a result of relative vertical movements between the molds and the gathering pool. This apparatus is characterized by the provision of electric contacts or feelers movable with each of the suction molds or receptacles of the forming machine, so that when the glass contacts therewith, an electric circuit will be completed through the glass, causing the operation of mechanism for stopping the relative movements between the molds or receptacles and the gathering pool when the lower ends of the molds or receptacles are in the desired relation with the glass of the pool.

Other objects and advantages of my invention will be pointed out in the detailed description thereof which follows, or will become apparent from such description.

In order that the prinicple of my invention may be fully comprehended and the manifold practical advantages thereof appreciated, reference should be had to the accompanying drawings in which I have illustrated two embodiments thereof. But it is to be understood that the invention is susceptible of embodiment in other forms of construction than those which are shown, and that various changes may be made in the details of construction without departing from the principle of the invention.

In the said drawings:

Fig. 2 is a view in vertical sectional elevation of another embodiment of the invention, showing a reciprocating revolving gathering pot, and showing diagrammatically electric circuits for controlling the elevation of the said pot into feeding relation to the molds of the forming machine, only one of such molds being shown;

Fig. 3 is a view in side elevation of a fragmentary portion of the construction shown in Fig. 2; and Fig. 4 is a fragmentary view of apparatus embodying a modification of the glass contacting means of Figs. 1 and 2.

Figure 1:
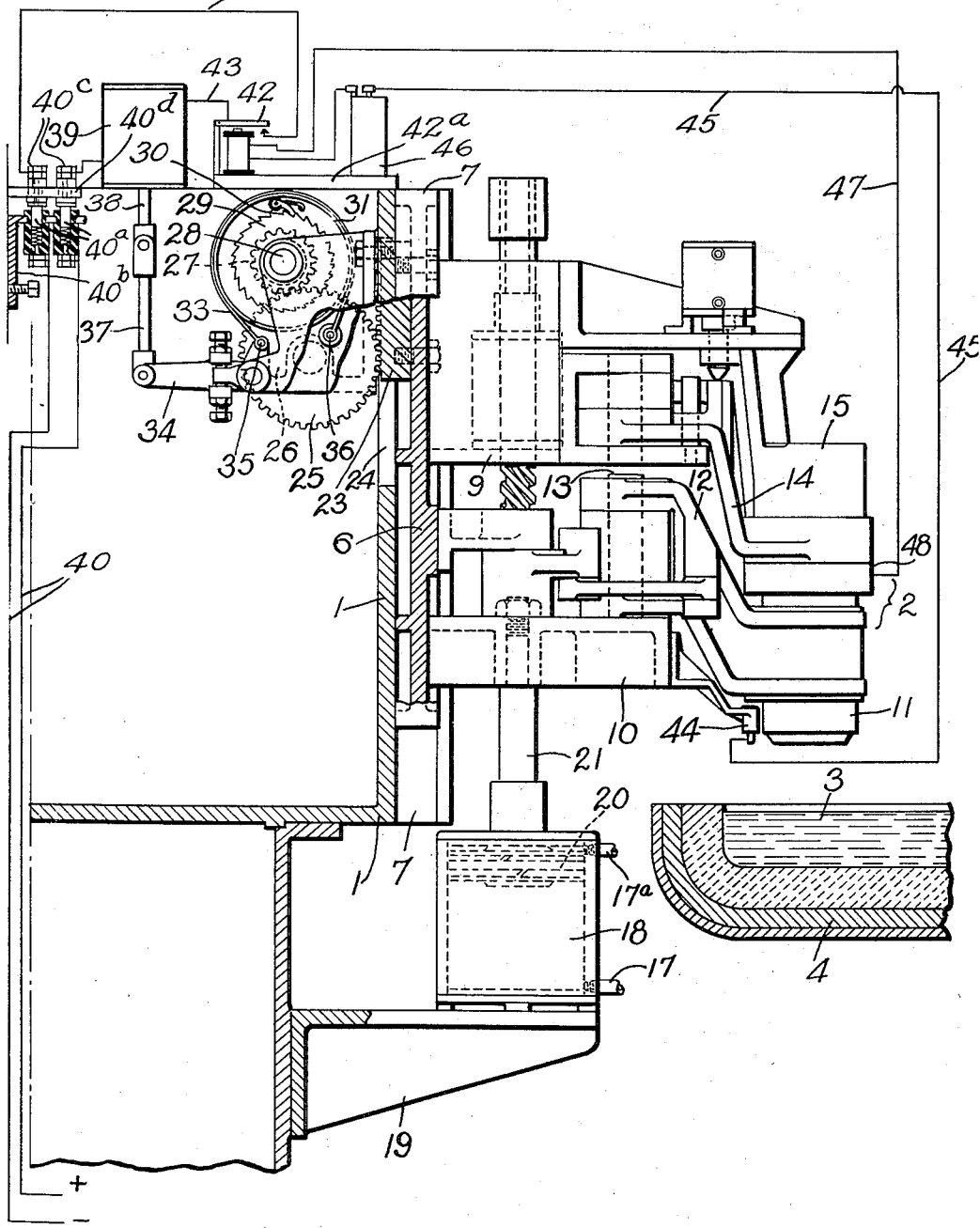
Figure 1 is a view in vertical sectional elevation of a fragmentary portion of a forming machine of the character in which the suction gathering molds are lowered to the gathering pool, and showing diagrammatically electric circuits for controlling the dip of one of such suction molds.

In the embodiment shown in Fig. 1, the level of the gathering pool container may be substantially constant while each of the glass gathering and forming units (only one of which is shown) is slidably mounted on a rotary turret for vertical reciprocatory movements to and from a position to gather glass from said pool. These units are successively brought into position above the pool by the rotation of the turret and thereafter are dipped into the glass until the bottom of the suction molds thereof contact with, or extend slightly below, the surface of the pool. The molds may be of various lengths and capacities and in order to regulate the movement or dip of the mold of each unit, such unit is provided with a downwardly extending electric contact or feeler insulated therefrom and connected to one side of a source of electric current supply, the mold itself being connected electrically through the unit and suitable control mechanism to the other side of the said source of electric current supply. When the dip control mechanism has operated to dip the mold into the bath to the required predetermined depth, the feeler will contact with the glass and an electric current will flow through the glass between the feeler and the mold to complete the electric circuit which in turn causes electric brake mechanism to be operated to stop the downward movement of the unit.

The embodiment shown in Figs. 2 and 3 differs from that shown in Fig. 1 in that a rotary pot containing the gathering pool is reciprocated vertically relatively to the suction gathering molds of the forming machine, the latter being adapted to be rotated at a substantially constant level. In the construction illustrated, the gathering pot is raised and lowered by the admission and exhaust of fluid pressure to a cylinder containing a piston connected to the supporting shaft of the pot. Each of the units of the forming machine (only one of which is shown) has an electric contact or feeler affixed thereto, and as each of the molds is moved into position above the pool and the gathering pot simultaneously elevated, the lower ends of the mold and of the feeler are dipped into the glass.

This causes an electric circuit to be completed through the glass between the feeler and the mold and through a circuit including electrically operated brake mechanism which is then actuated to stop the upward movement of the gathering pot, and consequently the dip of the mold into the glass also is stopped.

Referring more particularly to Fig. 1, the supporting and operating structure for the glass gathering and parison forming units of a machine embodying the present invention may include a carrier or turret 1 mounted to rotate about a vertical axis. This rotary carrier or turret may be supported and rotated in suitable known manner and by suitable means for successively bringing each of the glass gathering and parison forming units carried thereby, one of which is illustrated at 2, to a position to be dipped into the glass of a gathering pool 3 in a suitable container 4, which may be a furnace boot or forehearth, or a rotary gathering pot. As will be understood, the glass gathering and parison forming units, which may be arranged radially of the turret 1, are identical in construction. Therefore, illustration and description of one of them will suffice for all.

The unit 2 is supported for vertical reciprocation by a carriage including a vertically disposed plate 6 mounted in guides 7 provided on the turret. The carriage also includes spaced radially extending upper and lower arms 9 and 10 connected rigidly to the plate 6. The lower arm 10 carries a divided parison mold indicated at 11, the sections of which in turn are carried by holders 12 having arms pivotally mounted on the upstanding pivot stud 13 on the arm 10. Mounted on the upper arm 9, are the pivoted holders 14 which carry the sections of a neck ring that is adapted to cooperate with the parison mold. A combined suction and blow head 15 may be supported on the arm 9 in super-imposed relation to the neck ring when the latter is in the position shown.

The arms 9 and 10 may carry mechanism for opening and closing the neck ring sections and parison mold sections at appropriate times in the cycle of rotation of the turret 1, but such mechanism forms no part of the present invention and will not be described in detail. A detailed description of the construction and operation of similar mechanism will be found in my copending application Serial No. 338,932, filed February 11, 1929.

Vertical reciprocation of the glass gathering and parison forming unit may be effected by the admission of fluid pressure from a suitable source through the inlet ports 17 and 17a of the cylinder 18, carried by a bracket 19 secured to the turret 1, in which cylinder is mounted a piston 20, the rod 21 of which is rigidly connected to the arm 10 previously referred to. The admission and exhaust of fluid to and from the cylinder 18 may be controlled by suitable valve mechanism, not shown, which may be operated in timed relation to the movement or rotation of the gathering unit or units into and out of position above the pool. Such mechanism may operate so as to normally hold the unit in raised position and to permit it to be successively lowered to and raised from the pool as it reaches and leaves the gathering position, or if preferred, the said mechanism may be adjusted and operated to permit the unit normally to assume its lowermost position, then to be raised as the unit is rotated toward the gathering position to permit it to clear the side of the container for the gathering pool as it approaches the gathering position, to be subsequently lowered toward the glass, thereafter to be raised to clear the wall of the container as it leaves the gathering position, and subsequently to be restored to its lowermost position.

While the molds of the forming machine may be of the same length, it may be highly desirable to employ molds of different lengths, as above stated, and therefore, for this and other reasons, it is necessary or desirable to provide means for regulating and controlling the dip of the molds into the gathering pool. The means for so regulating and controlling the dip of the various molds may be substantially as follows: Connected to the rear side of the plate 6 is a rearwardly and vertically extending rack 23 which projects inwardly through a slot 24 in the turret and meshes with a pinion 25 suitably journaled in bracket 26 mounted on the inner side of the turret 1 as shown. This pinion 25 in turn meshes with a smaller pinion 27, secured to a shaft 28 to which shaft also is secured a ratchet wheel 29 with which engages a pawl 30, carried by a brake drum 31 loosely mounted on the shaft 28. A brake band 33 is provided for cooperating with the brake drum 31, the said band being operated to apply pressure to the drum by means of a bell crank lever 34 pivotally mounted on the bracket 26 and connected at 35 to one end of the brake band, the other end of which is fixed as indicated at 36. The lever 34 in turn is connected by a link 37 to an armature 38 of a solenoid 39. Current may be supplied to solenoid 39 in a suitable manner, as for example by means of a distributor including brushes and contactors such as that shown in the patent to Ferngren No. 1,328,273, which discloses a circuit between members on a rotary mold table and other members stationary with respect to said table.

As shown in Fig. 1, conductors 40 lead from a suitable current source, such as the circuit of the building, to brushes 40—a in mounting or ring 40—b, which may be secured to the column of the machine. Thus the brushes are supported in position for periodic engagement with contacts 40—c, carried by a plate 40—d, suitably connected to the rotary turret of the machine. One of the contacts may be connected directly to the solenoid 39 as shown, and the other through conductor 41, relay switch 42, and conductor 43.

It will be understood that brushes 40—a may serve to supply current to other pairs of contacts 40—c of additional mold units.

Relay switch 42 may be suitably mounted on turret 1 as by means of support 42—a secured to the turret. The operation of the relay switch 42 for causing operation of the brake may be controlled through the following circuit: Mounted on and insulated from the outer end of the arm 10 is a contact or feeler 44, connected by conductor 45 to one pole of a battery 46 on support 42—a, the other pole of which is connected to the solenoid of relay switch 42. The solenoid 42 in turn is connected by a conductor 47 to a portion of the glass gathering unit 2 to which the parison body mold is electrically connected, as indicated at 48. Thus, conductor 47 will be connected electrically to mold 11. If preferred, a pair of feelers may be provided on or in association with each mold instead of employing the mold itself as one or such feelers or contacts, as hereinafter explained with reference to Figs. 2 and 4.

As the glass gathering and parison forming unit 2 is rotated to bring the mold above the pool, the fluid pressure in the lower part of cylinder 18 is exhausted by suitable valve mechanism, (not shown) to permit the said unit to be lowered by gravity and dipped into the glass. Fluid pressure also may be admitted through port 17a to assist such downward movement if desirable or necessary. Such dipping operation causes the bottom of the mold 11 and the contact or feeler 44 to dip into the molten glass, as a result of which the circuit through the solenoid of the relay switch 42 is completed, solenoid 39 is energized, and the brake band is tightened on the brake drum which, acting through pawl 30, ratchet wheel 29, pinions 27 and 25, and rack 23, stops the downward movement of the glass gathering and parison forming unit. When the charge has been gathered in the mold 11 by the application of suction thereto through the head 15, fluid will again be admitted into cylinder 18 through port 17 and exhausted through port 17a to raise the unit out of glass gathering position. It will be noted that the brake will be ineffective to prevent upward movement of the glass gathering unit, because such upward movement causes the ratchet wheel 29 to move clockwise independently of the brake drum 31, as will be obvious. It will be apparent that the extent to which the mold 11 is immersed or dipped into the bath, may be controlled by properly adjusting the feeler 44 relative to the bottom of the mold. By providing each of the glass gathering and parison mold units with mechanism, such as described above, its dip into the gathering pool may be independently controlled thereby permitting molds of different lengths and capacities to be employed. Moreover, by the employment of my invention, the molds will be dipped to the required depth, irrespective of variations in the level of glass in the gathering pool.

In the form of embodiment shown in Figs. 2 and 3, a revolving gathering pot 50 is provided with mechanism for elevating it periodically to a greater or lesser extent to present the glass therein to the glass gathering units, the molds of which may be of varying lengths and capacities. One of such units is shown at 51, and it will be understood that it, and other similar units, may be carried by a rotary table or turret which may be continuously operated to move them successively toward a position above the gathering pot. The molds may be supported at a fixed level or levels while the gathering pool is periodically raised and lowered as above described.

Glass may be supplied to the gathering pool in the rotary pot 50 through the outlet 52 of a melting tank 53, the flow of glass through the outlet being controlled by means of a plunger or valve 54, or in any other known manner. The rotary pot 50 may be provided with a cover (not shown) and a fire space may be provided therebeneath to aid in reconditioning the glass during the rotation of the pot.

The illustrated mechanism for rotating and reciprocating the pot is as follows. The said pot is carried by a vertical shaft 55 to which it is rigidly secured, the said shaft being mounted to slide and rotate in bearings on a pedestal 56. This shaft is rotatably driven by suitable power mechanism (not shown) connected to a worm 57, which meshes with worm gear 58, slidably keyed to the shaft 55, as shown. The said worm and worm gear are inclosed within a housing 59 formed on the pedestal 56. The pot 50 and the glass therein are elevated periodically by the application of fluid pressure from a suitable source (not shown) to the space below a piston 61 located in a cylinder 62 to bring the surface of the glass into contact with successive molds. The cylinder 62 is pivotally supported at 63 on the lower portion or base of the pedestal 56. The rod 64 of the said piston is pivotally connected at its upper end to the outer end portion of a lever or arm 65 formed integrally with a yoke 66 pivoted at 67 to the upper portion of the pedestal 56. The sides of the yoke 66 carry rollers, one of which is indicated at 69, which engage the bottom of a bearing collar 70, loosely mounted on the shaft 55. This collar 70 cooperates with a complementary collar 71, rigidly secured to the shaft 55. A raceway is formed between the said collars and in this raceway are located ball bearings 72 for preventing friction between the said collars as the shaft 55 rotates.

As stated already, the rotary pot 50 may be elevated to various levels for bringing the surface of the glass into contact and gathering relation with respect to the molds which may be, and preferably are, of different lengths. I shall now proceed to describe the mechanism for limiting the upward movement of the rotary pot, as a result of which the molds are dipped into the glass to the required depth irrespective of differences in their lengths and capacities and of variations in the level of the gathering pool.

Connected to the outer end of the lever 65 is a rack 74, which is slidably mounted in guideway 75, mounted on one side of the cylinder 62. This rack meshes with a pinion indicated at 76, mounted on a shaft 77 which carries a brake drum 78. This brake drum is engaged by a brake band 79, which is operated by a lever 80 to which lever is connected an armature 81 of a solenoid 82.

Electric current is supplied to the solenoid 82 by a generator or the like, indicated at 83. One pole of this generator is connected to one side of the solenoid by conductor 84, the other pole being connected by a conductor 85 to a relay switch 86 which in turn is connected by a conductor 87 to the other side of the said solenoid, and is operated to close or break the circuit through the solenoid. One side of the solenoid of the relay switch 86 is connected to one pole of a battery 88, the other pole of which is connected through electric current distributor 88—a and conductor 89 to a contact or feeler 90 carried by and insulated from the mold of the glass gathering and parison forming unit 51. The distributor 88—a may be of the same construction as that shown in Fig. 1. The other side of the solenoid of the relay switch 86 is connected through a timer 91, distributor 88—a, and conductor 92 to the said mold. If preferred, a pair of feelers or contacts, similar to that shown at 90—a, Fig. 4, may be provided on or in association with each of the mold units in lieu of employing the mold itself as one of such contacts or feelers. Such feelers also may be substituted in the embodiment of Fig. 1, as previously stated.

I have not undertaken to illustrate in detail mechanism which may be employed for electrically connecting a plurality of mold units and feelers to the electric brake circuit; but it will be understood that the invention contemplates the duplication of the contacts of the electric distributors of Figs. 1 and 2 for this purpose.

The operation of the above described mechanism may be substantially as follows: The pot 50 may be continuously rotated. As the glass gathering unit of the forming machine is moved to a position above the pool, the pot is elevated by the admission of fluid pressure to the lower end of the cylinder 62, such admission of fluid being controlled by valve mechanism (not shown) operating in timed relation to the rotation of the table or turret (not shown) which carries the said unit. When the pot has been elevated to such an extent that the surface of the glass therein contacts with the feeler 91 and the mold dips into the glass, current will flow through the glass between the feeler and the mold, thereby completing the circuit through the solenoid of the relay switch 86, the timer 91 being operated at such speed that current will flow therethrough at this time. Consequently, the relay switch closes and current flows through the solenoid 82, causing the brake band 79 to be tightened on the brake drum 78. This operation of the brake immediately stops the upward movement of the pot 50, it being understood that only a slight braking action is required to overcome the pressure in cylinder 62, because of the comparatively great weight of the rotary pot 50 and the glass contained therein. After a charge of glass has been gathered in the mold, as by the application of suction thereto in a known manner, the circuit through timer 91 will be broken, as a result of which the brake will be released. At the same time, the fluid pressure in the lower part of the cylinder 62 will be exhausted therefrom and if desired, pressure fluid may be supplied to the upper part of the cylinder 62 to positively move the piston 61 and the parts connected therewith downwardly. It will be understood that the admission of fluid pressure to, and the exhaust thereof from, the cylinder 62, as well as the operation of the timer switch 91, may be controlled in timed relation to the times of successive presentation of glass gathering units to gathering position above the pot 50.

It now will be seen that by providing each of the glass gathering units of a suction fed forming machine with a contact, or contacts, adjusted with relation to the mold and connecting the respective units and contacts in the brake operating circuit, for example, as described above with respect to mold unit 51, the elevation of the rotary gathering pot 50 will immediately be stopped at the desired levels for dipping the respective molds into the glass, and the molds will be dipped to the required depths irrespective of their lengths and capacities and of variations of the level of glass in the pot.

It is to be understood that the words "dip" and "immersion", as used in the specification and claims, are used to describe, or define, the contact of the mold or molds with the glass in a gathering pool whether such contact is effected by moving the mold or molds toward the pool, or by moving the pool toward the mold or molds.

I claim as my invention:

1. In glassware forming apparatus, the combination of a suction gathering receptacle, a gathering pool for supplying glass to said receptacle, means for effecting relative movement between said receptacle and gathering pool to cause contact between a portion of the receptacle and the glass, and means controlled in response to the relative movement of the receptacle and the glass to automatically limit the extent of dip of the receptacle in the glass.

2. In glassware forming apparatus, a suction gathering receptacle, a gathering pool for supplying glass to said receptacle, means for moving said receptacle to a position above the glass, means for effecting relative vertical movements between said receptacle and the gathering pool, and means operated in response to the movement of said receptacle relative to the glass to automatically limit the extent of the dip thereof into the glass as a result of such movement.

3. In a forming machine having a suction mold, a gathering pool for supplying glass to said mold, means for moving said mold to a position above the glass, means for effecting relative movements between the mold and the said pool to cause the lower end of the said mold to be brought into gathering contact with the glass in said pool, and electric contact means movable with said mold and adapted to contact with the glass substantially simultaneously with the mold to automatically control the dip of the said mold into the glass, irrespective of the length of said mold.

4. In combination with a forming machine, having a suction gathering receptacle, a gathering pool for supplying glass to said receptacle, means for moving said receptacle to a position above the glass, means for moving the said receptacle downwardly toward the glass in said pool, and means controlled automatically by the dipping of the lower end of said receptacle into the glass for stopping the operation of said last-named means.

5. In combination with a forming machine, having a suction gathering receptacle, a gathering pool for supplying glass to said receptacle, means for moving said receptacle to a position above the said pool, means for moving said receptacle downwardly toward the glass in said pool to gather a charge of glass therefrom, means controlled automatically by the dipping of said receptacle into the glass for stopping the operation of said last-named means, and means for permitting said receptacle to be moved upwardly out of contact with the glass after the gathering of a charge of glass thereby.

6. In combination with a forming machine, having a suction mold, a gathering pool for supplying glass to said mold, an electric contact movable with said mold, means for effecting relative vertical movements between the said mold and said pool to cause said mold and the contact to be partly immersed in the glass in said pool, an electric circuit connected to said contact, the said contact being adapted to complete the said circuit upon the dipping thereof into the glass, and means controlled by the flow of current through said circuit for determining the extent of relative movement between said mold and the said gathering pool.

7. In combination with a forming machine, having a suction mold, a gathering pool for supplying glass to said mold, means for effecting relative vertical movement between the said pool and the said mold to cause the latter to be partly immersed in the glass contained in said pool, a brake for stopping the operation of said last-named means, and means acting automatically to operate the said brake upon partial immersion of the said mold to the desired extent in the said glass.

8. In combination with a forming machine, a continuously rotating turret having a glass gathering and parison forming unit mounted thereon, said unit including a carriage slidably supported by said turret, means for reciprocating said carriage and unit, a gathering pool for supplying glass to said unit, the rotation of the said turret and unit and the reciprocation of the carriage causing a portion of the unit to be dipped into the glass in said pool, means for stopping the downward movement of the said unit, and means controlled by the dipping of the mold into the glass for operating said last-named means.

9. In glassware forming apparatus, the the combination of a suction gathering receptacle, a container for supplying glass to said receptacle, means for moving said container vertically upwardly with respect to said receptacle to cause the receptacle to dip in the glass in said container, and means controlled in response to the relative movement of the receptacle and the glass to automatically stop the upward movement of said container.

10. In glass machinery, electric contact means, a pool of molten glass, means for effecting periodic relative movement between said pool and said contact means toward and away from each other to cause periodic contact of the contact means with the glass of the pool, and an electric circuit completed on said contact for controlling the extent of immersion of the contact means in the glass.

Signed at Hartford, Connecticut this 8th day of May, 1929.

KARL E. PEILER.